(12) United States Patent
Hegwein et al.

(10) Patent No.: US 11,597,270 B2
(45) Date of Patent: Mar. 7, 2023

(54) ACTUATING DEVICE FOR OPENING AND CLOSING A COVER IN OR ON A VEHICLE ON DEMAND AND COVER WITH SUCH AN ACTUATING DEVICE

(71) Applicant: ILLINOIS TOOL WORKS INC., Glenview, IL (US)

(72) Inventors: Matthias Hegwein, Ippesheim (DE); Jan Dvorak, Niederstetten (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 419 days.

(21) Appl. No.: 16/798,680

(22) Filed: Feb. 24, 2020

(65) Prior Publication Data
US 2020/0269684 A1 Aug. 27, 2020

(30) Foreign Application Priority Data

Feb. 26, 2019 (EP) ..................................... 19159532
May 16, 2019 (DE) .......................... 102019112885.4
Feb. 10, 2020 (DE) .......................... 102020103285.4

(51) Int. Cl.
*B60K 15/05* (2006.01)
*E05B 47/00* (2006.01)
(Continued)

(52) U.S. Cl.
CPC .......... *B60K 15/05* (2013.01); *E05B 47/0004* (2013.01); *E05B 81/06* (2013.01); (Continued)

(58) Field of Classification Search
CPC ............ B60K 15/05; B60K 2015/0584; B60K 2015/0538; B60K 2015/0515; E05B 47/004; E05B 1/06; E05B 83/34
(Continued)

(56) References Cited

U.S. PATENT DOCUMENTS

2011/0252599 A1 10/2011 Kutschat
2012/0222356 A1 9/2012 Beck
(Continued)

FOREIGN PATENT DOCUMENTS

CN 102678009 A 9/2012
CN 103163805 A 6/2013
(Continued)

OTHER PUBLICATIONS

Witte Automotive, "Actuating device, in particular fora lock in a motor vehicle", Apr. 11, 2013, German Patent Office, DE20201152026 (Year: 2013).
(Continued)

*Primary Examiner* — Dennis H Pedder
(74) *Attorney, Agent, or Firm* — Thompson Hine LLP

(57) ABSTRACT

An actuating apparatus for opening and closing a cover in or on a vehicle has a blocking device for blocking the cover in a locked position. The blocking device has a transmission mechanism with a rotation part (64.1; 50) mounted rotatably and driveable by an actuator (34), and a blocking bar (62) which is operatively connected to the rotation part. The transmission mechanism converts a rotation movement of the rotation part into an axial movement of the blocking bar. The blocking bar is transferable with the aid of the rotation part from a release position into a blocking position. The transmission mechanism is self-locking so that, at least whenever the blocking bar is in the blocking position, the rotation part is not driveable via an axial movement of the blocking bar, and the rotation part prevents an axial movement of the blocking bar out of the blocking position.

16 Claims, 5 Drawing Sheets

(51) Int. Cl.
*E05B 81/06* (2014.01)
*E05B 83/34* (2014.01)

(52) U.S. Cl.
CPC .............. *B60K 2015/0515* (2013.01); *B60K 2015/0523* (2013.01); *B60K 2015/0538* (2013.01); *B60K 2015/0561* (2013.01); *B60K 2015/0576* (2013.01); *B60K 2015/0584* (2013.01); *E05B 83/34* (2013.01)

(58) Field of Classification Search
USPC ...................................................... 296/97.22
See application file for complete search history.

(56) References Cited

U.S. PATENT DOCUMENTS

| | | | |
|---|---|---|---|
| 2015/0008685 A1* | 1/2015 | Beck | E05B 81/06 292/336.3 |
| 2016/0305166 A1 | 10/2016 | Georgi | |
| 2016/0348408 A1 | 12/2016 | Watanabe | |
| 2019/0093392 A1 | 3/2019 | Schwab | |
| 2019/0242161 A1 | 8/2019 | Beck | |

FOREIGN PATENT DOCUMENTS

| | | |
|---|---|---|
| CN | 207315062 U | 5/2018 |
| CN | 207617505 U | 7/2018 |
| DE | 19747707 A | 5/1999 |
| DE | 10064133 A1 | 7/2002 |
| DE | 102011052026 U1 | 2/2013 |
| DE | 10 2012 004 071 A1 | 9/2013 |
| DE | 10 2018 123 949 A1 | 3/2019 |
| FR | 3016854 A1 | 7/2015 |
| WO | WO 9828557 A1 | 7/1998 |
| WO | WO 0107738 A1 | 2/2001 |
| WO | WO 2016103210 | 6/2016 |

OTHER PUBLICATIONS

Malik et al., "Blocking device with a side switch", Feb. 7, 1998, German Patent Office. W09828557A (Year: 1998).
Perez et al., "Closure and Opening Device for Closing and Opening an Automotive Vehicle Opener and Fuel Trap Comprising Such a Closing and Opening Device" Jul. 31, 2015, French Patent Office, FR3016854A1 (Year: 2015).

* cited by examiner

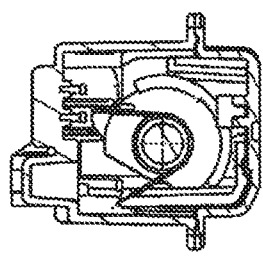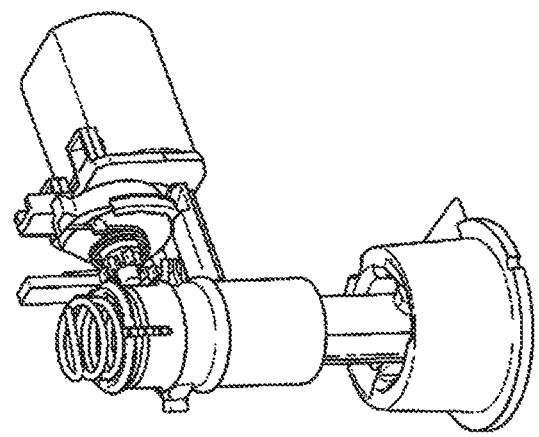
FIG. 2C / FIG. 3C
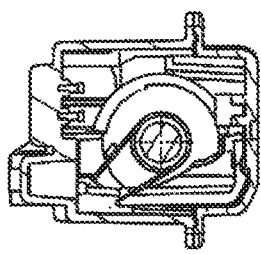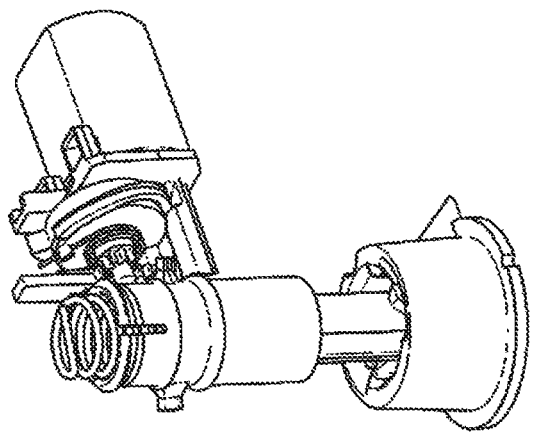
FIG. 2B / FIG. 3B
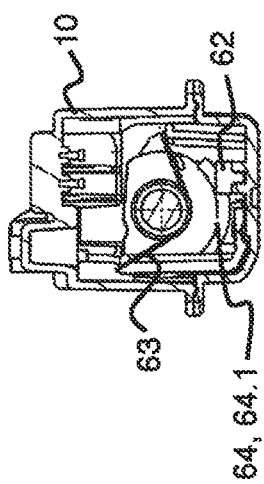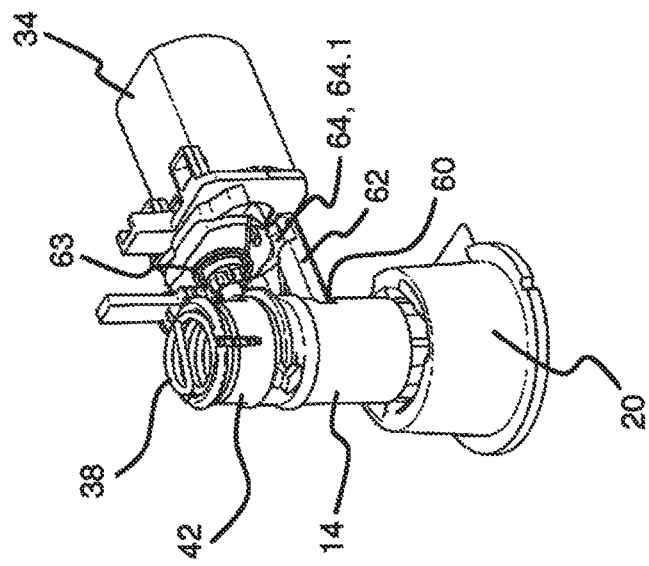
FIG. 2A / FIG. 3A

ACTUATING DEVICE FOR OPENING AND CLOSING A COVER IN OR ON A VEHICLE ON DEMAND AND COVER WITH SUCH AN ACTUATING DEVICE

TECHNICAL FIELD

The invention relates generally to actuating apparatuses for covers in the automobile sector.

BACKGROUND

The prior art DE 10 2012 004 071 A1 shows an actuating apparatus for actuator-opening of a cover, in which a plunger is fastened to the cover and engages in a base unit. Reliable sealing of the base unit against environmental influences is difficult here.

DE 10 2018 123 949 A1, published after the priority date of this application to be covered here, relates to an actuating apparatus for the manual opening of a cover, wherein a plunger is mounted rotatably in a base unit and, with an actuating sleeve on the cover, which has a helical groove on its inner wall, forms a manually releasable lock. In contrast thereto, according to the invention described below, the lock is preferably releasable under remote control by an actuator, and therefore the cover opens automatically following actuation of the actuator. A multiplicity of components of the invention covered here coincide with the components which are described in DE 10 2018 123 949 A1. To this extent, these parts of the description from DE 10 2018 123 949 A1 are incorporated by reference into the description of the invention covered here.

The inventors found it disadvantageous that sealing the base part of an actuating apparatus for the actuator-opening of a cover according to the prior art is difficult.

A further disadvantage in the case of the actuating apparatuses known from the prior art is that the actuating apparatuses or manually releasable locks are not designed to be crash-proof. This relates in particular to the actuating apparatus known from DE 10 2018 123 949 A1.

SUMMARY

The object on which the invention is based was to improve the above-described disadvantage. The object is achieved by the invention, in particular as it is defined in the independent claims.

The object on which the invention is based is achieved in particular by an actuating apparatus for opening and closing a cover in or on a vehicle as required, wherein the actuating apparatus has a blocking device for blocking the cover in a locked position as required, wherein the blocking device has a transmission mechanism with a rotation part which is mounted rotatably and is driveable by an actuator of the blocking device, and a blocking bar which is operatively connected to the rotation part, and wherein the transmission mechanism is designed to convert a rotation movement of the rotation part into an axial movement of the blocking bar.

For blocking the cover in the locked position as required, the blocking bar is transferable with the aid of the rotation part from a release position into a blocking position. The transmission mechanism is furthermore designed to be self-locking in such a manner that, at least whenever the blocking bar is in the blocking position, the rotation part is not driveable via an axial movement of the blocking bar, and that the rotation part—preferably when the rotation part is stationary—prevents an axial movement, preferably induced by the drive, of the blocking bar out of the blocking position.

The provision of such a transmission mechanism effectively protects the lock, which can be realized with the blocking device, against inertial influences, wherein the possibility of emergency unlocking is simultaneously maintained.

In other words, the self-locking design of the transmission mechanism effectively prevents the blocking bar of the blocking device from being able to drive the rotation part by inertial influences or by another force acting on the blocking bar.

Various solutions are suitable for realizing the transmission mechanism of the blocking device. For example, the transmission mechanism of the blocking device can have an eccentric control mechanism, wherein the eccentric control mechanism includes the rotation part which is in the form of an eccentric disk. Alternatively or additionally thereto, the transmission mechanism of the blocking device can have a worm transmission, wherein the worm transmission includes the rotation part which is in the form of a worm. Alternatively or additionally thereto, the transmission mechanism of the blocking device can have a cam control mechanism, wherein the cam control mechanism includes the rotation part which is in the form of a drum cam.

According to preferred realizations of the actuating apparatus, the rotation part is assigned a spring element which exerts a torque on the rotation part, the torque acting in the direction of rotation of the rotation part, which also brings about an axial movement of the blocking bar into the blocking position. It is preferably provided here that the spring element assigned to the rotation part preloads the rotation part in one direction of rotation in such a manner that said preloading brings about the preloading of the blocking bar into the blocking position.

For defining and/or limiting a rotational range of the rotation part, which can be realized with the actuator of the blocking device, and/or a rotational movement of the spring element, which can be realized with the actuator of the blocking device, the rotation part can be assigned at least one stop.

It is appropriate here that the at least one stop, preferably the two stops or all of the stops, is composed of a basic layer and a surface layer preferably connected to the basic layer by means of multi-component injection molding, wherein the surface layer forms a contact point of the stop, wherein the basic layer is composed of a material, preferably ABS, PPT, PE, POM, PA, which is harder than the material of the surface layer, preferably TPE, TPV. The formation of the at least one stop from a relatively soft material makes it possible to effectively prevent the production of noise when the rotation part strikes against the at least one stop.

In a preferred realization of the actuating apparatus, the transmission mechanism of the blocking device has an eccentric control mechanism, including the rotation part which is in the form of an eccentric disk, wherein the eccentric control mechanism and preferably the eccentric disk of the eccentric control mechanism is in a rotational position defined by a first stop assigned to the eccentric disk when the blocking bar is in the release position, and wherein the eccentric control mechanism and preferably the eccentric disk of the eccentric control mechanism is in a rotational position defined by a second stop assigned to the eccentric disk when the blocking bar is in the blocking position.

According to a further aspect of the present invention, the object on which the invention is based is achieved in particular by an actuating apparatus for opening and closing a cover in or on a vehicle as required, wherein the actuating apparatus has a blocking device for blocking the cover in a locked position as required. According to the invention, it is provided in particular that the blocking device has a preferably self-locking transmission mechanism with a rotation part, which is mounted rotatably and is driveable by an actuator of the blocking device, and a blocking bar, which is operatively connected to the rotation part. The transmission mechanism is designed here to convert a rotation movement of the rotation part into an axial movement of the blocking bar, wherein the transmission mechanism is preferably furthermore designed in such a manner that the rotation part is not driveable via an axial movement of the blocking bar. Self-locking is preferably used for this purpose.

For blocking the cover in the locked position as required, the blocking bar is transferable with the aid of the rotation part into a blocking position. According to the invention, it is provided in particular that the rotation part is assigned a spring element which exerts a torque on the rotation part, the torque acting in the direction of rotation of the rotation part, which also brings about an axial movement of the blocking bar into the blocking position.

The provision of such a transmission mechanism with a corresponding spring element effectively protects the lock, which can be realized with the blocking device, against inertial influences, wherein the possibility of emergency unlocking is simultaneously maintained.

In other words, the spring element which is assigned to the rotation part of the transmission mechanism effectively prevents the blocking bar of the blocking device from being able by inertial influences to overcome the spring preloading which is exerted with the spring element, which is in particular in the form of a torsion spring. It is thereby effectively prevented that the cover (for example a tank-recess flap or charging-recess flap) can be unintentionally opened at high accelerations.

According to embodiments of the actuating apparatus according to the invention, it is provided that the preferably self-locking transmission mechanism of the blocking device has an eccentric control mechanism with a rotation part which is in the form of an eccentric disk, and/or a worm transmission with a rotation part which is in the form of a worm, and/or a cam control mechanism with a rotation part which is in the form of a drum cam.

With regard to the spring element assigned to the rotation part, it is preferably provided that said spring element preloads the rotation part in one direction of rotation in such a manner that said preloading brings about the preloading of the blocking bar into the blocking position. The spring element assigned to the rotation part is preferably a torsion spring, spiral spring or leg spring.

According to developments of the actuating apparatus according to the invention, it is provided that the blocking device is designed to preload the blocking device, by means of a spring element of the blocking device and preferably by means of the spring element assigned to the rotation part, into a blocking position, in which the cover is held in the locked position, and to release the blocking position by means of the actuator of the blocking device.

According to a preferred realization of the actuating apparatus according to the invention, the latter has a housing, which is designed for installation in a vehicle. The actuating apparatus of this embodiment furthermore has a manipulator, which is mounted in the housing, and a spring, which preloads the manipulator into a discharge position. Furthermore, use is made of an actuating element, which is connectable or is connected to the cover or to a part carrying the cover and which is operatively connected to an end region of the manipulator.

For blocking the cover and/or the manipulator and/or the actuating element as required in a locked position against a movement of the manipulator into the discharge position, the actuating apparatus according to this embodiment has a blocking device of the previously described type. The blocking device therefore in particular comprises a preferably self-locking transmission mechanism with a rotation part which is mounted rotatably and is driveable by the manipulator, and a blocking bar which is operatively connected to the rotation part.

The transmission mechanism is designed in particular to convert a rotation movement of the rotation part into an axial movement of the blocking bar, wherein the transmission mechanism has self-locking which prevents the rotation part from being driveable via the blocking bar. For blocking the cover and/or the manipulator and/or the actuating element in the locked position as required, the blocking bar is transferable with the aid of the rotation part into a blocking position.

In this embodiment, it is provided in particular that the rotation part is assigned a spring element which exerts a torque on the rotation part, the torque acting in the direction of rotation, which brings about an axial movement of the blocking bar into the blocking position.

The provision of such a spring element effectively prevents a pulse which occurs as a consequence, for example, of a crash and acts on the spring element and/or on the blocking bar from being able to inadvertently or unintentionally cancel the blocking position.

Various embodiments are suitable for the transmission mechanism of the blocking device. According to a preferred embodiment of the present invention, the transmission mechanism comprises an eccentric control mechanism, preferably with an eccentric disk and an eccentric pin, wherein the eccentric control mechanism can be used to convert a rotation of a preferably electric-motor actuator belonging to the actuating apparatus into a linear movement of the blocking bar.

Alternatively thereto, it is, however, also conceivable for the transmission mechanism to have a worm gear or similar apparatus in order to correspondingly actuate the blocking bar.

In particular, it is conceivable in this connection that the preferably self-locking transmission mechanism of the blocking device has an eccentric control mechanism with a rotation part which is in the form of an eccentric disk, and/or a worm transmission with a rotation part which is in the form of a worm gear, and/or a cam control mechanism with a rotation part which is in the form of a drum cam.

According to developments of the actuating apparatus according to the invention, the spring element assigned to the rotation part preloads the rotation part in one direction of rotation in such a manner that said preloading brings about the preloading of the blocking bar into the blocking position.

In principle, the embodiments herein disclosed of the actuating apparatus according to the invention are distinguished in that the spring element assigned to the rotation part exerts a torque on the rotation part, the torque acting in the direction of rotation, and brings about an axial movement of the blocking bar into the blocking position. For this purpose, use is made, for example, of a torsion spring, spiral spring and/or leg spring as the spring element.

The provision of such a transmission mechanism with a corresponding spring element effectively protects the lock, which can be realized with the blocking device, against inertial influences, wherein the possibility of emergency unlocking is simultaneously maintained.

In other words, the spring element which is assigned to the rotation part of the transmission mechanism effectively prevents the blocking bar of the blocking device from being able by inertial influences to overcome the spring preloading which is exerted with the spring element, which is in particular in the form of a torsion spring. It is thereby effectively prevented that the cover (for example a tank-recess flap or charging-recess flap) can be unintentionally opened at high accelerations.

According to one realization of the actuating apparatus according to the invention for opening and closing a cover in or on a vehicle as required, the cover preferably being a tank flap or charging-recess flap, the actuating apparatus has the following features:
- a housing, which is suitable for installation in a vehicle,
- a plunger or a plunger-shaped actuating element, which is mounted rotatably about its longitudinal axis in the housing and which has an outer actuating end projecting out of the housing via a housing opening and an inner actuating end lying opposite the outer actuating end and situated within the housing,
- a spring, in particular a torsion spring, preferably in the housing, which preloads the plunger or the plunger-shaped actuating element into a discharge position, which is preferably a first rotary position of the plunger or of the plunger-shaped actuating element,
- an actuating sleeve, which is connectable or is connected to the cover or to a part carrying the cover, for example by being produced integrally with the cover or the part carrying the cover, and into which the plunger or the plunger-shaped actuating element can be introduced by means of its outer actuating end, and at least one actuating groove extending helically around the longitudinal axis of the actuating sleeve, at least in sections, is formed on the inside of said sleeve, into which groove at least one actuating projection of the plunger or of the plunger-shaped actuating element engages when the plunger has been introduced into the actuating sleeve, or when the actuating element has been introduced into the actuating sleeve, with the result that the plunger or the plunger-shaped actuating element is rotated about its longitudinal axis during an axial relative movement between the actuating sleeve and actuating element, wherein the spring is extended, preferably twisted, counter to its preloading as the plunger or the plunger-shaped actuating element is rotated in the course of the introduction of the plunger or the plunger-shaped actuating element into the actuating sleeve,
- a blocking device, by means of which the plunger or the plunger-shaped actuating element can be blocked against a movement into the discharge position in a locked position, which is preferably a second rotary position of the plunger or of the plunger-shaped actuating element rotated with respect to the discharge position, wherein the blocking device is designed to preload the blocking device by means of a spring element of the blocking device into a blocking position, in which the plunger or the plunger-shaped actuating element is held in the locked position, and to release the blocking position by means of an actuator, preferably an electric motor, of the blocking device.

By this means, the base part, which is formed by the housing and the components fitted thereto, can be sealed more simply, since there is no opening in the housing, into and/or out of which the plunger has to move.

Preferably, the following is true in the locked position and/or discharge position of the plunger: when the plunger has been introduced axially completely into the actuating sleeve and is in the locked position, the plunger cannot be released axially from the actuating sleeve without rotating the plunger, because of the actuating groove. When the actuating projection is located at the height of the front edge of the actuating sleeve that is further away from the cover, introduction or withdrawal of the plunger into or out of the actuating sleeve is possible only if the plunger is in its discharge position and thus the actuating projection can engage in the actuating groove.

In a further actuating apparatus according to the invention, it is provided that the blocking device comprises a blocking bar, and wherein the plunger comprises a blocking recess on its outside, wherein the blocking bar is preloaded in the direction of the blocking recess by means of the spring element, when the plunger is in the locked position, into a blocking position, in which it engages in the blocking recess, and can be moved counter to the spring element by means of the actuator into a release position retracted from the blocking recess.

In a further actuating apparatus according to the invention, it is provided that the actuator drives the blocking bar via a cam control mechanism preferably having a drum cam, wherein a rotation of the actuator can be converted into a linear movement of the blocking bar by means of the cam control mechanism.

The drum cam can be formed by a worm gear.

In a further actuating apparatus according to the invention, it is provided that the spring element preloads a component of the cam control mechanism, preferably the drum cam, in one direction, with the result that this preloading brings about the preloading of the blocking bar into the blocking position.

Preferably, the arrangement is such that, as a result of activation of the actuator, the spring element is preloaded still further and, as a result of deactivation of the actuator, the spring element moves the component of the cam control mechanism back in the direction of the blocking position again. The blocking bar then bears on the plunger with a certain preloading and, as soon as the blocking recess is rotated to the height of the blocking bar again as a result, for example, of closing the cover and thus rotation induced on the plunger by the actuating sleeve via the actuating groove and actuating projection, the preloaded blocking bar is moved into the blocking recess and locked.

In a further actuating apparatus according to the invention, it is provided that the spring element is a torsion spring.

In a further actuating apparatus according to the invention, it is provided that the actuator is an electric motor having an output axis, wherein the output axis is perpendicular to the axis of rotation of the plunger.

In a further actuating apparatus according to the invention, it is provided that a seal, preferably a sealing ring surrounding the housing opening, is provided between the housing opening and the plunger.

In a further actuating apparatus according to the invention, it is provided that at least one actuating groove of the actuating sleeve forms, at its inner end, at least one end receptacle, in which the at least one actuating projection of the plunger is accommodated in such a way in the state in which it is fully introduced into the actuating sleeve that the plunger cannot be released from the actuating sleeve without being rotated again in said sleeve.

In a further actuating apparatus according to the invention, it is provided that a position sensor, which indicates an open and/or closed position of the cover, is provided.

In a further actuating apparatus according to the invention, it is provided that the position sensor comprises a position switch, which is actuated by a position projection formed on the plunger when the cover is in the open and/or closed position.

In a further actuating apparatus according to the invention, it is provided that a manual release device, preferably in the form of a pulling device, is provided, wherein the blocking position of the blocking device, preferably the blocking bar, can be released by manual actuation of the release device, preferably by pulling the pulling device.

In this way, a manual emergency actuating possibility is provided.

In a further actuating apparatus according to the invention, it is provided that the release device is a pulling device having a pulling strip comprising a manually actuable actuating end, wherein the opposite end of the pulling strip is fixed in its position. The fixing is at least such that the pulling strip does not get lost.

In a further actuating apparatus according to the invention, it is provided that the pulling device comprises an actuating section which, when pulled manually, acts on a component of the cam control mechanism or some other part transmission between the actuator and the blocking bar or on the blocking bar itself in such a way that the blocking bar can be moved in the direction of its release position.

According to a further aspect of the present invention, the underlying object is achieved by an actuating apparatus for opening and closing a cover in or on a vehicle as required, wherein the actuating apparatus has a housing which is designed for installation in a vehicle. The actuating apparatus according to this aspect furthermore has a manipulator, which is mounted in the housing, and a spring, which preloads the manipulator into a discharge position. Furthermore, the actuating apparatus according to this aspect has an actuating element, which is connectable or is connected to the cover or to a part carrying the cover and which is operatively connected to an end region of the manipulator.

Furthermore, the actuating apparatus according to this aspect has a blocking device by means of which the manipulator and/or the actuating element in a locked position can be blocked against a movement of the manipulator into the discharge position. The blocking device here is designed in order, by means of a spring element of the blocking device, to preload the blocking device into a blocking position in which the manipulator and/or the actuating element are/is held in the locked position, and to release the blocking position by means of an actuator of the blocking device.

According to developments of the actuating apparatus of the last-mentioned aspect of the invention, the blocking device has a blocking bar, and the manipulator and/or the actuating element have/has a blocking recess, wherein the blocking bar is preloaded in the direction of the blocking recess by means of the spring element into a blocking position in which it engages in the blocking recess, specifically when the manipulator and/or the actuating element are/is in the locked position, and wherein the blocking bar can be moved counter to the preloading force of the spring element by means of the actuator into a release position retracted from the blocking recess.

In particular, it is provided in this aspect of the present invention that the actuator drives the blocking bar via an eccentric control mechanism, wherein the eccentric control mechanism preferably has an eccentric disk and an eccentric pin, and wherein a rotation of the actuator can be converted via the eccentric control mechanism into a linear movement of the blocking bar.

According to realizations of this last-mentioned embodiment of the actuating apparatus according to the invention, it is provided that the spring element preloads a component of the eccentric control mechanism and preferably the eccentric disk of the eccentric control mechanism in one direction, with the result that said preloading brings about the preloading of the blocking bar into the blocking position.

According to embodiments of the actuating apparatus according to the invention, it is provided that the eccentric control mechanism and preferably the eccentric disk of the eccentric control mechanism is assigned at least one stop for defining and/or limiting a rotational range of the actuator.

In particular, it is conceivable in this connection that the eccentric control mechanism and preferably the eccentric disk of the eccentric control mechanism is in a rotational position defined by a first stop when the blocking bar is in the release position, wherein preferably the eccentric control mechanism, and in particular the eccentric disk of the eccentric control mechanism, is furthermore in a rotational position defined by a second stop when the blocking bar is in the blocking position.

In embodiments of the actuating apparatus according to the further aspect of the present invention, it can be provided that the manipulator is of sleeve-shaped design at least in regions, and that the actuating element is in the form of an actuating plunger and is introduced or can be introduced with an actuating end region into the manipulator, which is of sleeve-shaped design at least in regions. In particular, it can be provided here that at least one actuating groove extending helically at least in sections around the longitudinal axis of the manipulator, which is of sleeve-shaped design at least in regions, is formed on the inside of the manipulator, which is of sleeve-shaped design at least in regions. It is appropriate here that at least one actuating projection formed on the actuating end region of the actuating element engages in the at least one actuating groove when the actuating end region of the actuating element in the form of an actuating plunger is introduced into the manipulator, which is of sleeve-shaped design at least in regions.

According to preferred realizations of the actuating apparatus of the further aspect of the present invention, it is provided that the housing of the actuating apparatus has a housing opening, via which the actuating element, and in particular the actuating end region of the actuating element, projects into the housing, and is operatively connected to the manipulator.

As also in the case of the actuating apparatus according to the previously described first aspect, it is preferably provided, in the case of the actuating apparatus according to the further aspect of the present invention, that the spring element is a torsion spring, spiral spring and/or leg spring. Furthermore, in the case of the further aspect of the present invention, it is provided that the actuator of the actuating apparatus is an electric motor drive (electric motor) having an output shaft, wherein said output shaft extends parallel to the longitudinal axis and axis of rotation of the manipulator.

Furthermore, it is preferred that, in the case of the further aspect of the actuating apparatus according to the invention, a position sensor, which indicates an open and/or closed position of the cover, is provided. In this connection, it is conceivable that the position sensor comprises, for example, a position switch, which is actuable or is actuated by a position projection formed on the manipulator and/or actuating element when the cover is in the open and/or closed position.

Finally, according to realizations of the actuating apparatus according to the invention of the further aspect of the present invention, it is provided that the actuating apparatus is assigned a manual release device, wherein the blocking position of the blocking device can be released by manual actuation of the release device. For example, the release device can have a pulling device having a pulling strip, wherein furthermore a manually actuable actuating end is provided, wherein the opposite end of the pulling strip is correspondingly fixed in its position.

In particular, the object on which the invention is based is also achieved by a cover, wherein the cover is a tank-recess and/or charging-recess cover and has an actuating apparatus of the type according to the invention.

BRIEF DESCRIPTION OF THE DRAWINGS

The invention will now be discussed in more detail by way of example on the basis of drawings. In the drawings:

FIGS. 2A to 2C show various states of the first embodiment in a sectional view with components partly blanked out, wherein in FIG. 2A the plunger (24) is in its locked position and the blocking bar (62) is in its blocking position and the actuator (34) is not activated, wherein in FIG. 2B the plunger (14) is in its discharge position and the blocking bar (62) is in its release position and the actuator (34) is activated, wherein in FIG. 2C the plunger (14) is in its discharge position and the blocking bar (62) is located between its release position and blocking position and the actuator (34) is not activated, FIGS. 3A to 3C show the various states of the embodiment as in FIGS. 2A to 2C, but in a perspective view.

DETAILED DESCRIPTION

Figure 1:
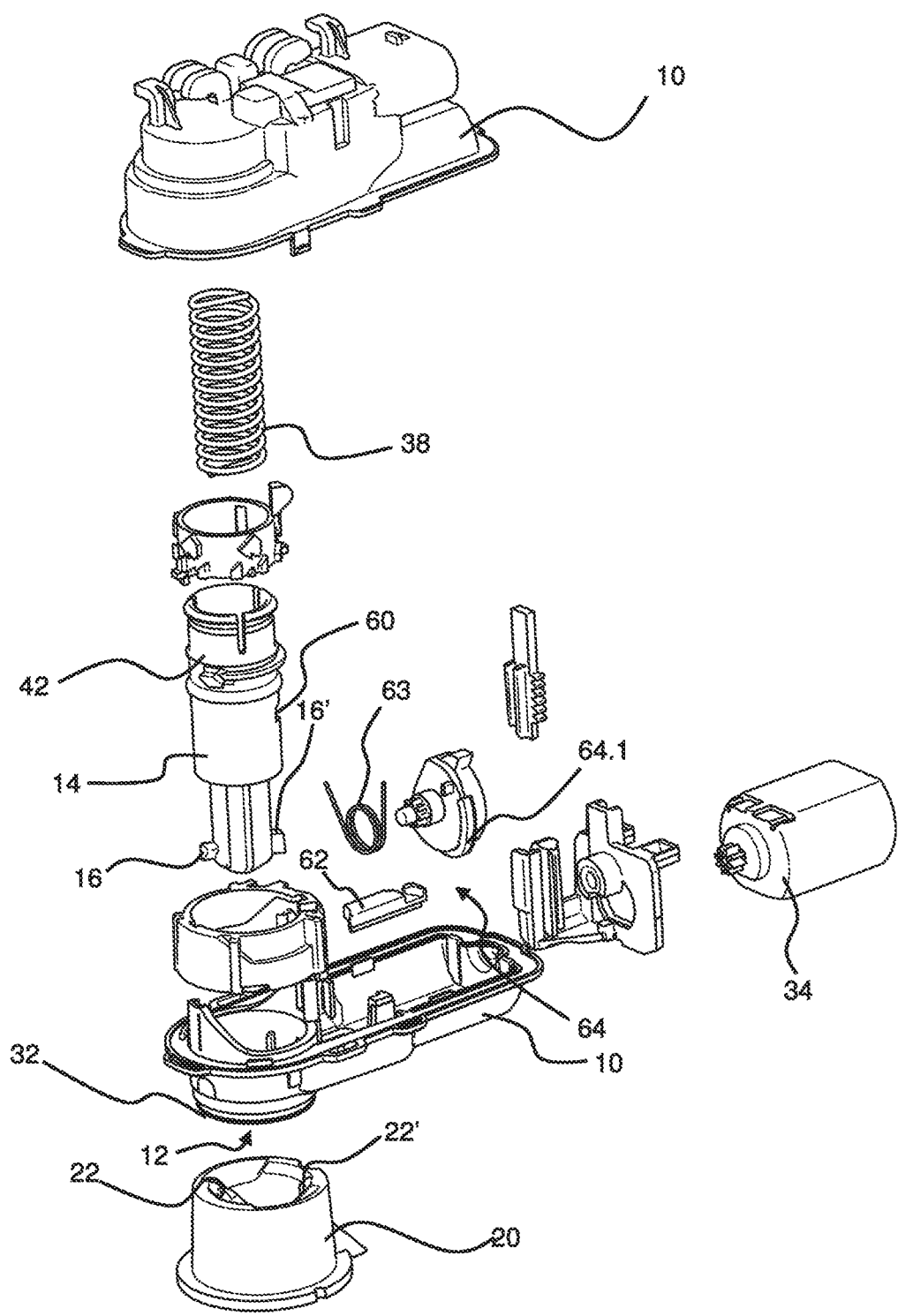
FIG. 1 shows a first embodiment of an apparatus according to the invention.

A more detailed description of FIG. 1 follows. The configuration is such that the actuating apparatus is designed for opening and closing a cover, which here is a tank flap or charging-recess flap, in or on a vehicle, comprising:

a housing 10, which is suitable for installation in a vehicle, a plunger 14, which is mounted rotatably about its longitudinal axis in the housing 10 and which has an outer actuating end projecting out of the housing 10 via a housing opening 12 and an inner actuating end 42 lying opposite the outer actuating end and situated within the housing, a spring 38, in particular a torsion spring, here in the housing 10, which preloads the plunger 14 into a discharge position, which here is a first rotational position of the plunger 14, an actuating sleeve 20, which is connectable or is connected to the cover or to a part carrying the cover, for example by being produced integrally with the cover or the part carrying the cover, and into which the plunger 14 can be introduced by means of its outer actuating end, and at least one actuating groove 22 extending helically around the longitudinal axis of the actuating sleeve 20, at least in sections, is formed on the inside of said sleeve, into which groove at least one actuating projection 16 of the plunger 14 engages when the plunger 14 has been introduced into the actuating sleeve 20, with the result that the plunger 14 is rotated about its longitudinal axis during an axial relative movement between the actuating sleeve 20 and the plunger 14, wherein the spring 38 is extended, here twisted, counter to its preloading as the plunger 14 is rotated in the course of the introduction of the plunger 14 into the actuating sleeve 20, a blocking device, by means of which the plunger 14 can be blocked against a movement into the discharge position in a locked position, which here is a second rotational position of the plunger 14 rotated with respect to the discharge position, wherein the blocking device is designed to preload the blocking device by means of a spring element 63 of the blocking device into a blocking position, in which the plunger 14 is held in the locked position, and to release the blocking position by means of an actuator 34, here an electric motor, of the blocking device.

The configuration is such that the blocking device comprises a blocking bar 62, wherein the plunger 14 comprises a blocking recess 60 on its outside, wherein the blocking bar 62 is preloaded in the direction of the blocking recess 60 by means of the spring element 63, when the plunger is in the locked position, into a blocking position, in which it engages in the blocking recess 60, and can be moved counter to the spring element 63 by means of the actuator 34 into a release position retracted from the blocking recess 60. The configuration is such that the actuator 34 drives the blocking bar 62 via a cam control mechanism 64, here having a drum cam 64.1, wherein a rotation of the actuator 34 can be converted into a linear movement of the blocking bar 62 by means of the cam control mechanism 64. The drum cam is formed by a worm gear here. The configuration is such that the spring element 63 preloads a component of the cam control mechanism 64, here the drum cam 64.1, in one direction, with the result that this preloading brings about the preloading of the blocking bar 62 into the blocking position.

The configuration is such that the spring element 63 is a torsion spring. The configuration is such that the actuator 34 is an electric motor having an output axis, wherein the output axis is perpendicular to the axis of rotation of the plunger 14. The configuration is such that a seal, preferably a sealing ring 32 surrounding the housing opening 12, is provided between the housing opening 12 and the plunger 14. The configuration is such that the at least one actuating groove 22 of the actuating sleeve 20 forms, at its inner end, at least one end receptacle, in which the at least one actuating projection of the plunger 14 is accommodated in such a way in the state in which it is fully introduced into the actuating sleeve 20 that the plunger 14 cannot be released from the actuating sleeve 20 without being rotated again in said actuating sleeve.

Figure 4:
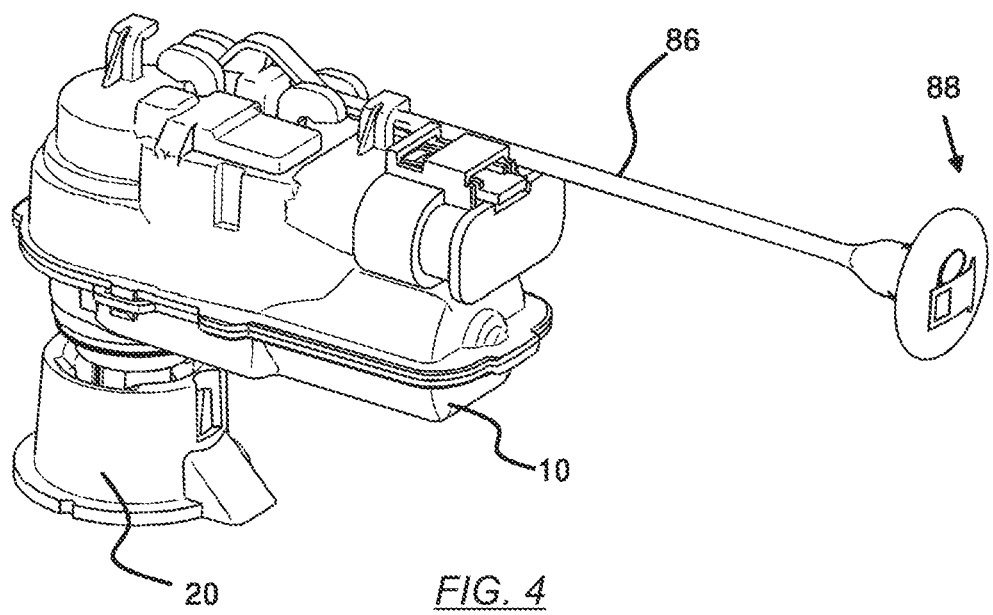
FIG. 4 shows the first embodiment with the housing (10) partially assembled.

A more detailed description of FIG. 4 follows. The configuration is such that a position sensor, which indicates an open and/or closed position of the cover, is provided. The configuration is such that the position sensor comprises a position switch 70, which is actuated by a position projection 72 formed on the plunger 14 when the cover is in the open and/or closed position.

Figure 5:
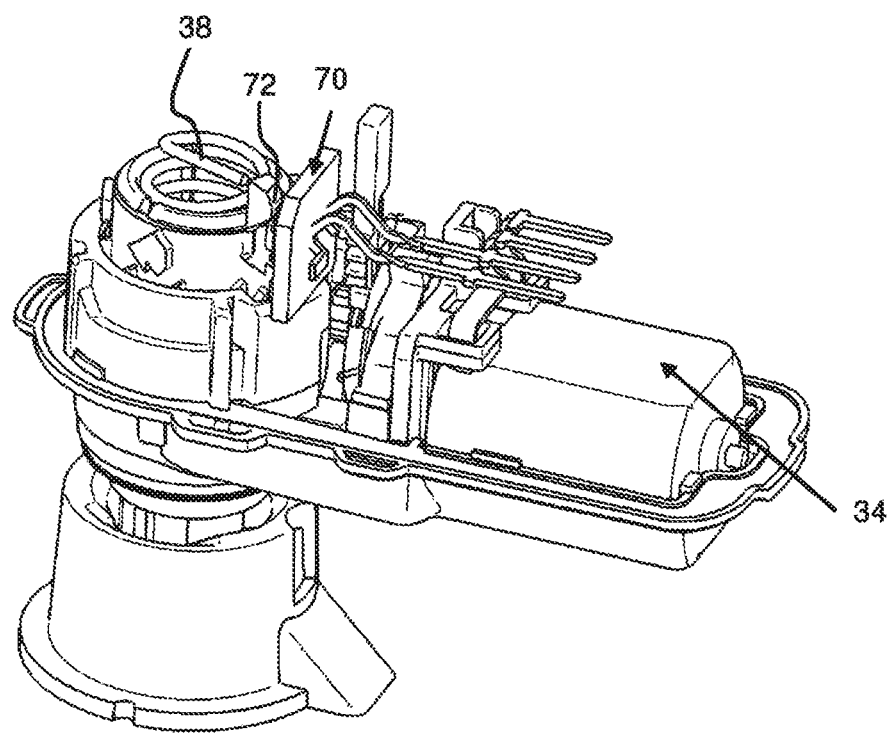
FIG. 5 shows the first embodiment with the housing (10) assembled.

A more detailed description of FIG. 5 follows. The configuration is such that a pulling device is provided, wherein the blocking position of the blocking device, here the blocking bar 62, can be released by manually pulling the pulling device. The configuration is such that the pulling device has a pulling strip 86 comprising a manually actuable actuating end 88, wherein the opposite end of the pulling strip 86 is fixed in its position in such a way that the pulling strip does not get lost. The configuration is such that the pulling device comprises an actuating section which, when pulled manually, acts on a component of the cam control mechanism 64 or some other transmission part between the actuator 34 and the blocking bar 62 or on the blocking bar 62 itself in such a way that the blocking bar 62 can be moved in the direction of its release position.

With reference to the illustrations in FIG. 6 to FIG. 9, a second exemplary embodiment of the actuating apparatus according to the invention will be described below.

Figure 6:
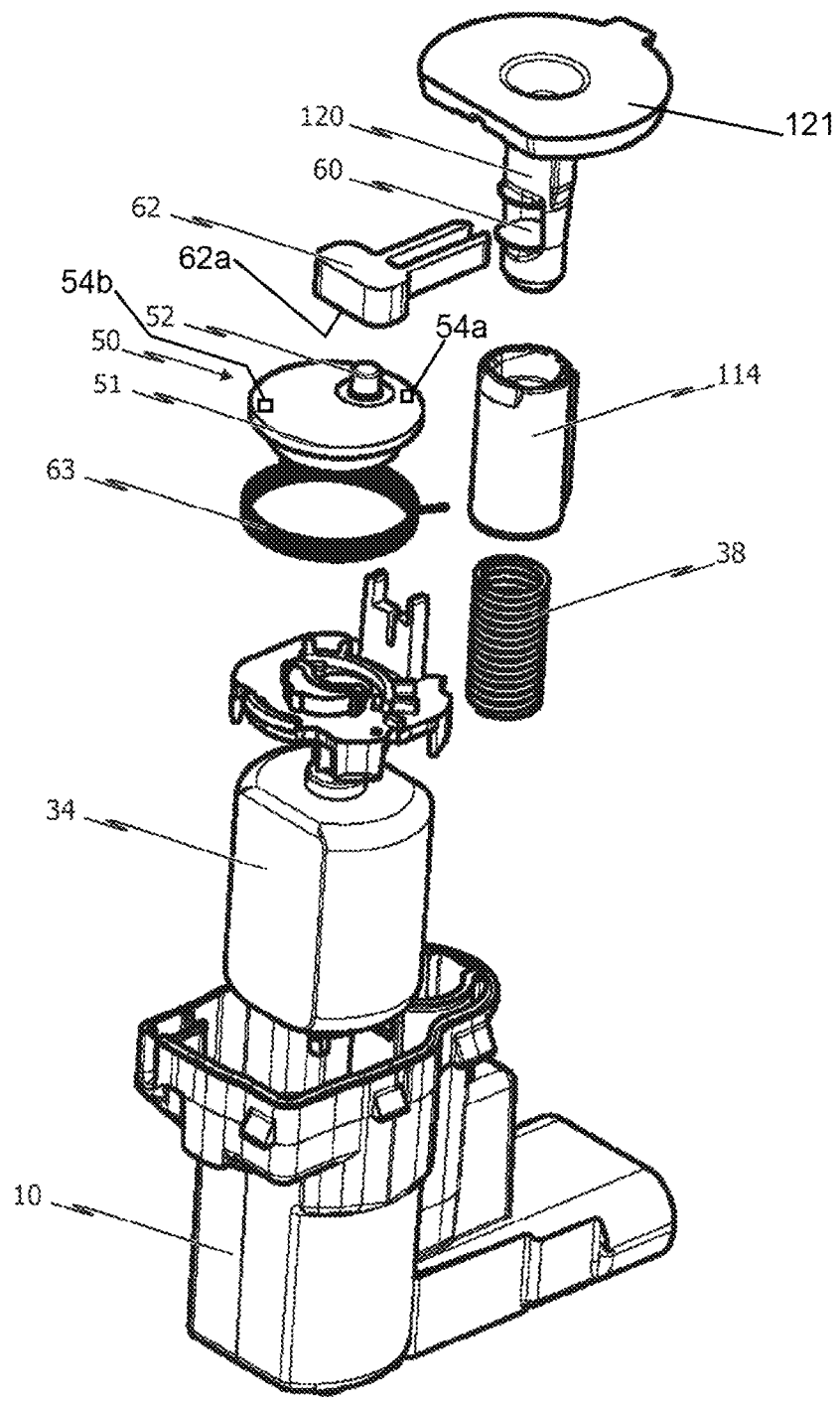
FIG. 6 shows schematically and in an isometric exploded illustration a second exemplary embodiment of the actuating apparatus according to the invention.

In detail, FIG. 6 shows schematically and in an isometric exploded illustration a second exemplary embodiment of the actuating apparatus according to the invention.

Figure 7:
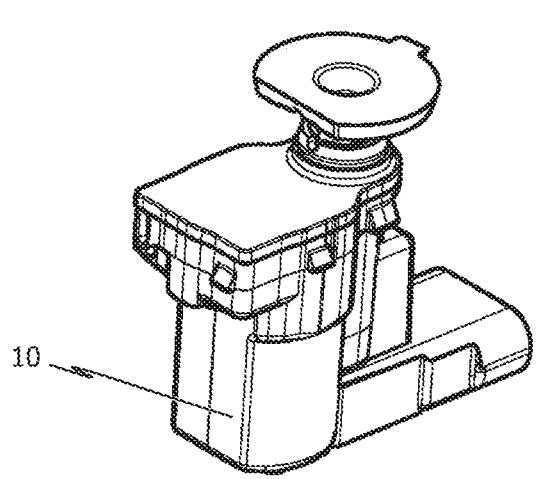
FIG. 7 shows schematically and in an isometric view the second exemplary embodiment of the actuating apparatus according to the invention according to FIG. 6, specifically in a state in which the manipulator (14) of the actuating apparatus is in its discharge position and the blocking bar (62) of the actuating apparatus is in its blocking position and the actuator (34) of the actuating apparatus is not activated.

FIG. 7 shows schematically and in an isometric view the second exemplary embodiment of the actuating apparatus according to the invention according to FIG. 6, specifically in a state in which the manipulator 14 of the actuating apparatus is in its discharge position and the blocking bar 62 of the actuating apparatus is in its blocking position and the actuator 34 of the actuating apparatus is not activated.

Figure 8A:
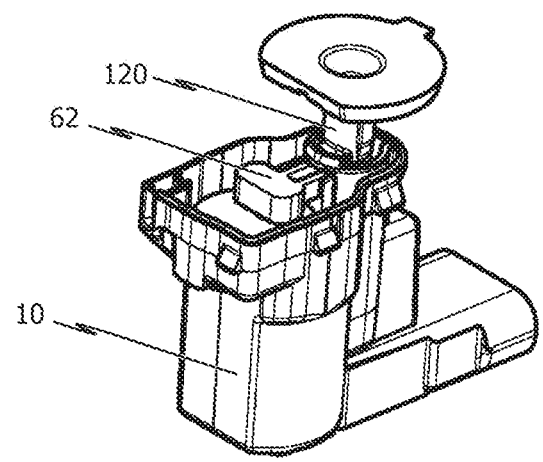
FIGS. 8A, and 8B show the second exemplary embodiment of the actuating apparatus according to the invention according to FIG. 7 with components partly blanked out, specifically in each case in a schematic and isometric view.
Figure 8B:
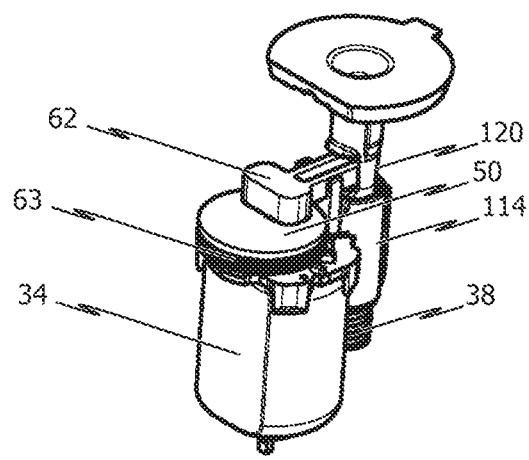

FIG. 8A and FIG. 8B show the second exemplary embodiment of the actuating apparatus according to the invention according to FIG. 7 with components partly blanked out, specifically in each case in a schematic and isometric view.

Figure 9:
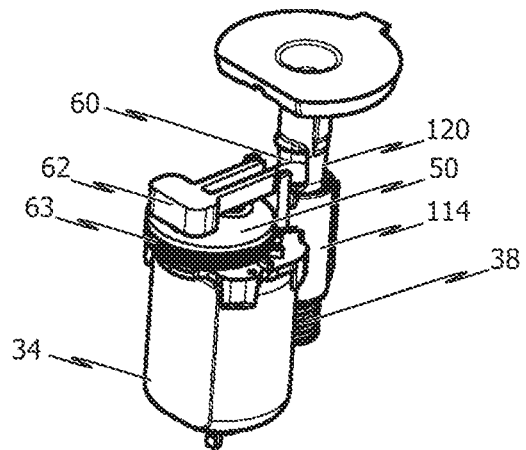
FIG. 9 shows the second exemplary embodiment of the actuating apparatus according to the invention according to FIG. 6 with components partly blanked out, wherein the manipulator (14) of the actuating apparatus is in its discharge position, and wherein the blocking bar (62) of the actuating apparatus is in its release position and the actuator (34) is activated.

FIG. 9 shows the second exemplary embodiment of the actuating apparatus according to the invention according to FIG. 6 with components partly blanked out, wherein the manipulator 14 of the actuating apparatus is in its discharge position, and wherein the blocking bar 62 of the actuating apparatus is in its release position and the actuator 34 is activated.

Also like the first exemplary embodiment of the actuating apparatus according to the invention described above with reference to the illustrations in FIG. 1 to FIG. 5, the second exemplary embodiment of the actuating apparatus according to the invention according to the illustrations in FIG. 6 to FIG. 9 serves in particular for the opening and closing of a cover as required, said cover preferably being a tank flap or charging-recess flap.

As can be gathered, for example, from the schematic exploded illustration according to FIG. 6, the actuating apparatus according to the second exemplary embodiment of the present invention has a housing 10, which is designed for installation in a vehicle. Furthermore, the actuating apparatus has a manipulator 114 mounted in the housing 10.

In contrast to the first exemplary embodiment of the actuating apparatus according to the invention, it is provided in the second exemplary embodiment that the manipulator 114 is not in the form of a plunger-shaped manipulator or plunger 14, but rather is in the form of a manipulator which is of sleeve-shaped design at least in regions.

A further difference can be seen in the fact that, in the second exemplary embodiment of the actuating apparatus according to the invention, the actuating element 120 is not in the form of an actuating sleeve 20 (as in the first exemplary embodiment according to FIG. 1 to FIG. 5), but rather is in the form of an actuating plunger.

As also in the first exemplary embodiment of the actuating apparatus according to the invention, in the second exemplary embodiment use is made of a spring 38 which is preferably accommodated in the housing 10 and preloads the manipulator 114, that is to say the manipulator 114 which is of sleeve-shaped design at least in regions, into a discharge position.

In the second exemplary embodiment of the actuating apparatus according to the invention, the actuating element 120 which has already been mentioned is in the form in particular of an actuating plunger and is connected or is connectable to the cover (not shown in FIG. 6 to FIG. 9) or to a part carrying the cover.

The plunger-shaped actuating element 120 can be operatively connected to an end region of the manipulator 114 of sleeve-shaped design in such a manner that, during an axial relative movement between the plunger-shaped actuating element 120 and the sleeve-shaped manipulator 114, the sleeve-shaped manipulator 114 is rotated about its longitudinal axis, wherein, during an axial movement of the sleeve-shaped manipulator 114 relative to the plunger-shaped actuating element 120 and in the direction of the plunger-shaped actuating element 120, the spring 38 which has already been mentioned is preloaded counter to its preloading.

Also like the actuating apparatus according to the first exemplary embodiment (cf. FIG. 1 to FIG. 5), the actuating apparatus according to the second exemplary embodiment (cf. FIG. 6 to FIG. 9) has a blocking device, by means of which, in the second exemplary embodiment of the actuating apparatus according to the invention, the sleeve-shaped manipulator 114 and in particular, however, the plunger-shaped actuating element 120 can be blocked in a locked position against a movement of the sleeve-shaped manipulator 114 into the discharge position.

The blocking device comprises a preferably self-locking transmission mechanism with a rotation part which is mounted rotatably and is driveable by the manipulator (here: eccentric disk 50), and a blocking bar 62 which is operatively connected to the rotation part 50.

The transmission mechanism is designed in particular to convert a rotation movement of the rotation part 50 into an axial movement of the blocking bar 62. For blocking the cover and/or the manipulator 114 and/or the actuating element 120 in the locked position as required, the blocking bar 62 is transferable with the aid of the rotation part 50 into a blocking position.

According to the invention, it is provided in particular that the rotation part 50 is assigned a spring element 63 which exerts a torque on the rotation part 50, the torque acting in the direction of rotation, which brings about an axial movement of the blocking bar 62 into the blocking position.

The provision of such a spring element 63 effectively prevents a pulse which occurs as a consequence, for example, of a crash and acts on the spring element 63 and/or on the blocking bar 62 from being able to inadvertently or unintentionally cancel the blocking position.

Various embodiments are suitable for the transmission mechanism of the blocking device. According to the embodiment of the present invention that is shown in FIG. 6 to FIG. 9, the transmission mechanism comprises an eccentric control mechanism 50, preferably with an eccentric disk 51 and an eccentric pin 52, wherein the eccentric control mechanism 50 can be used to convert a rotation of a preferably electric-motor actuator 34 belonging to the actuating apparatus into a linear movement of the blocking bar 62.

Alternatively thereto, it is, however, also conceivable for the transmission mechanism to have a worm gear or similar apparatus in order to correspondingly actuate the blocking bar.

According to the embodiment of the actuating apparatus according to the invention that is shown in FIG. 6 to FIG. 9, the spring element 63 assigned to the rotation part 50 preloads the rotation part 50 in one direction of rotation in such a manner that said preloading brings about the preloading of the blocking bar 62 into the blocking position.

The provision of such a transmission mechanism with a corresponding spring element 63 effectively protects the lock, which can be realized with the blocking device, against inertial influences, wherein the possibility of emergency unlocking is simultaneously maintained.

In other words, the spring element 63 which is assigned to the rotation part 50 of the transmission mechanism effectively prevents the blocking bar 62 of the blocking device from being able by inertial influences to overcome the spring preloading which is exerted with the spring element 63, which is in particular in the form of a torsion spring. It is thereby effectively prevented that the cover (for example a tank-recess flap or charging-recess flap) can be unintentionally opened at high accelerations.

According to the embodiment shown in FIG. 6 to FIG. 9, the blocking device is designed in particular in order, by means of the spring element 63, which is part of the blocking device, to preload the blocking device into a blocking position, in which the sleeve-shaped manipulator 114 and the plunger-shaped actuating element 120 are held in the locked position. Furthermore, the blocking device is designed in order, by means of an actuator 34, which is likewise part of the blocking device, to release said previously described blocking position.

Preferably, in the second exemplary embodiment of the actuating apparatus according to the invention, the actuator 34 of the blocking device is an electric motor drive (electric motor) which has an output shaft, wherein said output shaft extends parallel to the longitudinal axis and axis of rotation of the sleeve-shaped manipulator 114 (cf. the exploded illustration in FIG. 6).

Furthermore, it is provided in the second exemplary embodiment of the actuating apparatus according to the invention that the spring element 63 of the blocking device, with which spring element the blocking device is preloaded into the blocking position, is in the form of a torsion spring.

As can be gathered in particular from the exploded illustration in FIG. 6, it is provided in the second exemplary embodiment of the actuating apparatus according to the invention that the blocking device has a blocking bar 62, wherein the plunger-shaped actuating element 120 has a blocking recess 60 formed in a complementary manner at least in regions with respect to the blocking bar 62. According to a development of the second exemplary embodiment of the actuating apparatus according to the invention, the sleeve-shaped manipulator 114 can also have a corresponding blocking recess formed in a complementary manner at least in regions with respect to the blocking bar 62.

If the sleeve-shaped manipulator 114 and in particular the plunger-shaped actuating element 120 is in the locked position, the blocking bar 62 of the blocking device is preloaded by means of the spring element 63 (torsion spring) in the direction of the blocking recess 60 of the plunger-shaped actuating element 120 into a blocking position in which it engages in the blocking recess 60. The blocking bar 62 can be moved by means of the actuator 34 of the blocking device into a release position retracted from the blocking recess (cf. FIG. 9).

The second exemplary embodiment of the actuating apparatus according to the invention is distinguished from the first embodiment described previously with reference to the illustrations in FIG. 1 to FIG. 5 in particular in that, in the second exemplary embodiment of the actuating apparatus according to the invention, the actuator 34, which is in particular in the form of an electric motor, does not drive the blocking bar 62 via a worm gear or the like, but rather via an eccentric control mechanism 50, wherein said eccentric control mechanism 50 preferably has an eccentric disk 51 and an eccentric pin 52. A rotation of the actuator 34 or of the output shaft of the actuator 34 can be converted into a linear movement of the blocking bar 62 via said eccentric control mechanism 50.

In particular, it is provided here that the spring element 63 of the blocking device, said spring element preferably being in the form of a torsion spring, preloads a component of the eccentric control mechanism 50 and preferably the eccentric disk 51 in one direction (direction of rotation), and therefore said preloading brings about the preloading of the blocking bar 62 into the blocking position. In the exemplary embodiment of the actuating apparatus according to the invention that is illustrated schematically in FIG. 6 to FIG. 9, the spring element 63 of the blocking device, said spring element being in the form of a torsion spring, preloads the eccentric disk 51 of the eccentric control mechanism 50 in the clockwise direction.

Although at least not clearly visible in FIG. 6 to FIG. 9, it is preferred that the eccentric control mechanism 50, and preferably the eccentric disk 51 of the eccentric control mechanism 50, is assigned at least one stop in order to define and in particular to limit a rotational range of the actuator 34. In particular, it is preferred in this connection that the eccentric control mechanism 50, and preferably the eccentric disk 51, is in a rotational position defined by a first stop when the blocking bar 62 of the blocking device is in the release position (cf. FIG. 9), and that the eccentric control mechanism 50, and preferably the eccentric disk 51 of the eccentric control mechanism 50, is in a rotational position defined by a second stop when the blocking bar 62 is in the blocking position (cf. FIG. 8B).

It can be gathered from the schematic exploded illustration according to FIG. 6 that, in the second exemplary embodiment of the actuating apparatus according to the invention, the manipulator 114 is of sleeve-shaped design at least in regions, wherein the actuating element 120 is in the form of an actuating plunger and can be introduced with an actuating end region into the manipulator 114, which is of sleeve-shaped design at least in regions. It is provided in particular here that at least one actuating groove extending helically around the longitudinal axis of the manipulator 114 of sleeve-shaped design, at least in sections, is formed on the inside of the manipulator 114, which is of sleeve-shaped design at least in regions, wherein at least one actuating projection engages in the at least one actuating groove, said actuating projection being formed on the actuating end region of the actuating element 120 of plunger-shaped design.

Although not illustrated in FIG. 6 to FIG. 9, according to developments of the second exemplary embodiment of the actuating apparatus according to the invention, a position sensor is preferably provided which is designed to indicate an open and/or closed position of the cover (not shown in the drawings). For example, the position sensor can comprise a position switch, which is actuated by a position projection formed on the sleeve-shaped manipulator 114 and/or on the plunger-shaped actuating element 120 when the cover is in the open and/or closed position.

It is likewise of advantage, in the second exemplary embodiment of the actuating apparatus according to the invention, if the actuating apparatus is assigned a manual release device for manually releasing the blocking position of the blocking device as required. In this connection, it is conceivable for the release device to be a pulling device with a pulling strip which has a manually actuable actuating end.

The second exemplary embodiment of the actuating apparatus according to the invention has the advantage, in comparison to the first exemplary embodiment according to FIG. 1 to FIG. 5, that the lock is effectively protected against inertial influences, wherein the possibility of emergency unlocking is simultaneously maintained.

In particular, the locking concept used in the second exemplary embodiment of the actuating apparatus according to the invention is capable, despite the (manual) emergency unlocking which can be realized there, of effectively preventing the blocking bar 62 from overcoming the spring preloading, which is exerted with the spring element 63 in the form in particular of a torsion spring, by inertial influences. It is thereby effectively prevented that the cover (tank-recess flap or charging-recess flap) can be unintentionally opened at high accelerations. In addition, in the second exemplary embodiment of the actuating apparatus according to the invention, the blocking bar 62 of the blocking device has only a short stroke (overlapping with the actuating element 120) and, by means of the acceleration by the spring element 63, contributes to noise production.

In the second exemplary embodiment of the actuating apparatus according to the invention, as shown schematically in FIG. 6 to FIG. 9, the blocking bar 62 of the blocking device has a slotted guide 62a in which the eccentric pin 52 (pin) driven by the actuator 34 can be moved. Said eccentric pin 52 is mounted eccentrically with respect to the axis of the output shaft of the actuator 34, and therefore the rotational movement of the actuator or of the output shaft of the actuator 34 is converted into a translatory movement of the blocking bar 62.

The actuator 34 unlocks the system and, in the process, tensions the spring element 63 (torsion spring) which subsequently takes on the locking movement. These kinematics have two dead centers which are preferably defined via corresponding stops, wherein one of the two dead centers is used in order, in the locked state, to prevent an inertia-induced displacement of the blocking bar 62.

In the second exemplary embodiment of the actuating apparatus according to the invention, an emergency unlocking preferably takes place via a corresponding pulling strip (not shown in the drawings) which, in conjunction with the eccentric pin 52 of the eccentric control mechanism 50, introduces a rotational movement into the actuator 34. The design also has a larger stroke and lower movement speeds in the dead centers (lower loudness level) in comparison to the first exemplary embodiment of the actuating apparatus according to the invention that is shown schematically in FIG. 1 to FIG. 5.

In summary, the invention relates in particular to an actuating apparatus for opening and closing a cover in or on a vehicle as required, wherein the actuating apparatus has a blocking device for blocking the cover in a locked position as required, wherein the blocking device has a transmission mechanism with a rotation part 64.1; 50 which is mounted rotatably and is driveable by an actuator 34 of the blocking device, and a blocking bar 62 which is operatively connected to the rotation part 64.1; 50, wherein the transmission mechanism is designed to convert a rotation movement of the rotation part 64.1; 50 into an axial movement of the blocking bar 62, wherein, for blocking the cover in the locked position as required, the blocking bar 62 is transferable with the aid of the rotation part 64.1; 50 from a release position into a blocking position, wherein the transmission mechanism is furthermore designed to be self-locking in such a manner that, at least whenever the blocking bar 62 is in the blocking position, the rotation part 64.1; 50 is not driveable via an axial movement of the blocking bar 62, and that the rotation part 64.1; 50 prevents an axial movement of the blocking bar 62 out of the blocking position.

The transmission mechanism of the blocking device can
- have an eccentric control mechanism, including the rotation part which is in the form of an eccentric disk 51, and/or
- have a worm transmission, including the rotation part which is in the form of a worm, and/or
- have a cam control mechanism 64, including the rotation part which is in the form of a drum cam 64.1.

In particular, the rotation part 64.1; 50 is assigned a spring element 63 which exerts a torque on the rotation part 64.1; 50, the torque acting in the direction of rotation of the rotation part 64.1; 50, which also brings about an axial movement of the blocking bar 62 into the blocking position. The spring element 63 assigned to the rotation part 64.1; 50 preferably preloads the rotation part 64.1; 50 in one direction of rotation in such a manner here that said preloading brings about the preloading of the blocking bar 62 into the blocking position. The spring element 63 assigned to the rotation part 64.1; 50 is for example a torsion spring, spiral spring or leg spring.

It is generally appropriate that the rotation part 64.1; 50 is assigned at least one stop for defining and/or limiting a rotational range of the rotation part 64.1; 50, which can be realized with the actuator 34 of the blocking device, and/or a rotational movement of the spring element 63, which can be realized with the actuator 34 of the blocking device. The at least one stop is preferably composed of a basic layer and a surface layer preferably connected to the basic layer by means of multi-component injection molding, wherein the surface layer forms a contact point of the stop, wherein the basic layer is composed of a material, preferably ABS, PPT, PE, POM, PA, which is harder than the material of the surface layer, preferably TPE, TPV.

According to realizations of the actuating apparatus according to the invention, the transmission mechanism of the blocking device has an eccentric control mechanism, including the rotation part which is in the form of an eccentric disk 51, wherein the eccentric control mechanism 50, and preferably the eccentric disk 51 of the eccentric control mechanism 50, is in a rotational position defined by a first stop 54a assigned to the eccentric disk when the blocking bar 62 is in the release position, and wherein the eccentric control mechanism 50, and preferably the eccentric disk 51 of the eccentric control mechanism 50, is in a rotational position defined by a second stop 54b assigned to the eccentric disk when the blocking bar 62 is in the blocking position.

According to embodiments of the actuating apparatus according to the invention, the blocking device is designed to preload the blocking device by means of a spring element 63 of the blocking device and preferably by means of the spring element 63 assigned to the rotation part 64.1; 50 into a blocking position, in which the cover is held in the locked position, and to release the blocking position by means of the actuator 34 of the blocking device.

As illustrated in the drawings, the actuating apparatus can furthermore have the following:
- a housing 10, which is designed for installation in a vehicle;
- a manipulator 14; 114, which is mounted in the housing 10;
- a spring 38, which preloads the manipulator 14; 114 into a discharge position; and
- an actuating element 20; 120 which is connectable or is connected to the cover or to a part 121 for carrying the cover and which is operatively connected to an end region of the manipulator 14; 114.

The blocking device is designed here to block the cover and/or the manipulator 14; 114 and/or the actuating element 20; 120 as required in a locked position against a movement of the manipulator 14; 114 into the discharge position.

According to a development of this embodiment of the actuating apparatus according to the invention, the manipulator 14 is mounted rotatably about its longitudinal axis in the housing 10, wherein the actuating element 20 which is connectable or is connected to the cover or to a part carrying the cover is operatively connected to the end region of the manipulator 14 in such a manner that, upon an axial relative movement between the actuating element 20 and the manipulator 14, the manipulator 14 is rotated about its longitudinal axis, wherein, upon a rotation of the manipulator 14 during an axial movement of the manipulator 14 relative to the actuating element 20 and in the direction of the actuating element 20, the spring 38 is preloaded counter to its preloading.

According to a development of this embodiment of the actuating apparatus according to the invention, the actuator 34 is an electric motor having an output shaft, wherein the output shaft extends parallel to the longitudinal axis of the manipulator 14; 114.

According to a development of this embodiment of the actuating apparatus according to the invention, it is provided that the cover and/or the manipulator 14; 114 and/or the actuating element 20; 120 have/has a blocking recess 60, wherein the blocking bar 62 is preloaded in the direction of the blocking recess 60 by means of the spring element 63, when the manipulator 14; 114 and/or the actuating element 20; 120 are/is in the locked position, into a blocking position, in which it engages in the blocking recess 60, and can be moved counter to the preloading force of the spring element 63 by means of the actuator 34 into a release position retracted from the blocking recess 60.

According to realizations of the actuating apparatus according to the invention, it is provided that a position sensor, which indicates an open and/or closed position of the cover, is provided.

According to realizations of the actuating apparatus according to the invention, a manual release device is provided, wherein the blocking position of the blocking device can be released by manual actuation of the release device. The release device here can be a pulling device having a pulling strip 86 comprising a manually actuable actuating end 88, wherein the opposite end of the pulling strip 86 is fixed in its position.

The invention is not limited to the exemplary embodiments shown in the drawings but rather emerges from an overall view of all of the features herein disclosed.

In particular, the invention relates not only to an actuating apparatus of the type according to the invention that is disclosed herein, but also to a cover, wherein the cover is a tank-recess and/or charging-recess cover and has an actuating apparatus of the type according to the invention.

LIST OF REFERENCE SIGNS

10 Housing
12 Housing opening
14 Mounted plunger/plunger-shaped manipulator
16 Actuating projection
20 Actuating sleeve/sleeve-shaped actuating element
22 Actuating groove
32 Sealing ring
34 Actuator
38 Spring
42 Inner actuating end
50 Eccentric control mechanism
51 Eccentric disk
52 Eccentric pin
60 Blocking recess
62 Blocking bar
63 Spring element
64 Cam control mechanism
64.1 Drum cam
70 Position switch
72 Position projection
86 Pulling strip
88 Actuable actuating end
114 Sleeve-shaped manipulator
120 Plunger-shaped actuating element

What is claimed is:

1. An actuating apparatus for opening and closing a cover in or on a vehicle as required, wherein the actuating apparatus has a blocking device for blocking the cover in a locked position as required, wherein the blocking device has a transmission mechanism with a rotation part which is mounted rotatably and is driveable by an actuator of the blocking device, and a blocking bar which is operatively connected to the rotation part, wherein an engagement between the transmission mechanism and the blocking bar is configured such that a rotation movement of the rotation part is converted into an axial movement of the blocking bar, wherein, for blocking the cover in the locked position as required, the blocking bar is moveable, via rotation of the rotation part, from a release position into a blocking position, wherein the engagement between the transmission mechanism and the blocking bar is configured to be self-locking such that, at least whenever the blocking bar is in the blocking position, (i) axial movement of the blocking bar cannot cause rotation of the rotation part, and (ii) the rotation part prevents axial movement of the blocking bar out of the blocking position.

2. The actuating apparatus as claimed in claim 1, wherein the transmission mechanism of the blocking device has an eccentric control mechanism, including the rotation part which is in the form of an eccentric disk.

3. The actuating apparatus as claimed in claim 1,
wherein the rotation part is assigned a spring element which exerts a torque on the rotation part, the torque acting in the direction of rotation of the rotation part which also brings about an axial movement of the blocking bar into the blocking position.

4. The actuating apparatus as claimed in claim 3,
wherein the spring element assigned to the rotation part preloads the rotation part in one direction of rotation in such a manner that said preloading brings about the preloading of the blocking bar into the blocking position.

5. The actuating device as claimed in claim 1,
wherein the rotation part is assigned at least one stop for defining and/or limiting a rotational range of the rotational part.

6. The actuating apparatus as claimed in claim 5, wherein the at least one stop is composed of a basic layer and a surface layer connected to the basic layer by multi-component injection molding, wherein the surface layer forms a contact point of the stop, wherein the basic layer is composed of a material which is harder than the material of the surface layer.

7. The actuating apparatus as claimed in claim 6,
wherein the transmission mechanism of the blocking device has an eccentric control mechanism, including the rotation part which is in the form of an eccentric disk, wherein the eccentric disk of the eccentric control mechanism is in a rotational position defined by a first stop assigned to the eccentric disk when the blocking bar is in the release position, and wherein the eccentric disk of the eccentric control mechanism is in a rotational position defined by a second stop assigned to the eccentric disk when the blocking bar is in the blocking position.

8. The actuating apparatus as claimed in claim 3,
wherein the spring element assigned to the rotation part is a torsion spring, or spiral spring.

9. The actuating apparatus as claimed in claim 3,
wherein the blocking device is designed to preload the blocking device by means of the spring element assigned to the rotation part, into a blocking position, in which the cover is held in the locked position, and to release the blocking position by means of the actuator of the blocking device.

10. The actuating apparatus as claimed in claim 1,
wherein the actuating apparatus furthermore has the following:
a housing, which is designed for installation in a vehicle;
a manipulator, which is mounted in the housing;
a spring, which preloads the manipulator into a discharge position; and
an actuating element which is connectable or is connected to the cover or to a part carrying the cover and which is operatively connected to an end region of the manipulator,
wherein the blocking device is designed to block the actuating element as required in a locked position against a movement of the manipulator into the discharge position.

11. The actuating apparatus as claimed in claim 10,
wherein the manipulator is mounted rotatably about its longitudinal axis in the housing, and wherein the actuating element which is connectable or is connected to the cover or to a part carrying the cover is operatively connected to the end region of the manipulator in such a manner that, upon an axial relative movement between the actuating element and the manipulator, the manipulator is rotated about its longitudinal axis, wherein, upon a rotation of the manipulator during an axial movement of the manipulator relative to the actuating element and in the direction of the actuating element, the spring is preloaded counter to its preloading.

12. The actuating apparatus as claimed in claim 11,
wherein the actuator is an electric motor having an output shaft, wherein the output shaft extends parallel to the longitudinal axis of the manipulator.

13. The actuating apparatus as claimed in claim 12,
wherein the manipulator has a blocking recess, wherein the blocking bar is preloaded in the direction of the blocking recess by means of the spring element, when the manipulator and/or the actuating element are/is in the locked position, into a blocking position, in which it engages in the blocking recess, and can be moved counter to the preloading force of the spring element by means of the actuator into a release position retracted from the blocking recess.

14. An actuating apparatus for opening and closing a cover in or on a vehicle, the actuating apparatus comprising:
a blocking device for blocking the cover in a locked position, wherein the blocking device includes a transmission mechanism with a rotation part mounted rotatably and driveable by an actuator of the blocking device, and a blocking bar operatively connected to the rotation part;
wherein an engagement between the transmission mechanism and the blocking bar is configured such that a rotation movement of the rotation part is converted into an axial movement of the blocking bar;
wherein, for blocking the cover in the locked position, the blocking bar is moveable, via rotation of the rotation part from a release position into a blocking position;
wherein the engagement between the transmission mechanism and the blocking bar is configured to be self-locking such that, at least whenever the blocking bar is in the blocking position, (i) axial movement of the blocking bar cannot cause rotation of the rotation part, and (ii) the rotation part prevents axial movement of the blocking bar out of the blocking position;
wherein a spring element exerts a torque on the rotation part, the torque acting in the direction of rotation of the rotation part which also brings about an axial movement of the blocking bar into the blocking position.

15. The actuating apparatus as claimed in claim 14,
wherein the transmission mechanism of the blocking device has at least one of:
an eccentric control mechanism, including the rotation part which is in the form of an eccentric disk.

16. The actuating apparatus of claim 1, wherein the engagement between the transmission mechanism and the blocking bar includes a dead center position in which the rotation part prevents inertia-induced axial movement of the blocking bar out of the blocking position.

* * * * *